(No Model.)
G. DEE.
STOVE LIFTER.
No. 254,933. Patented Mar. 14, 1882.
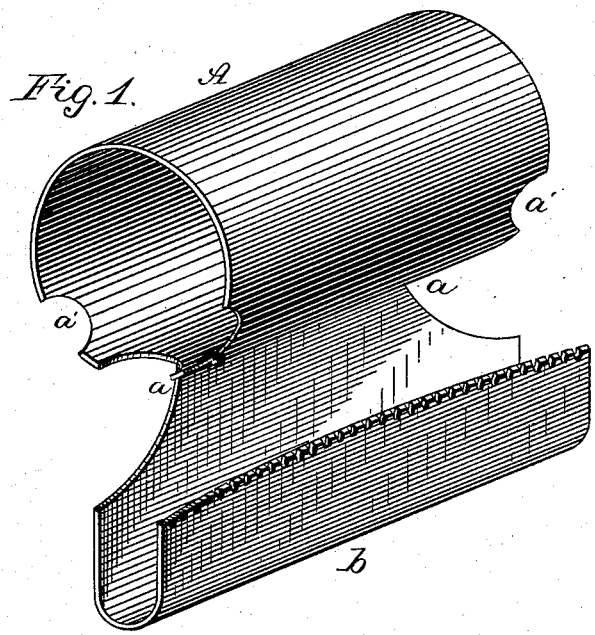
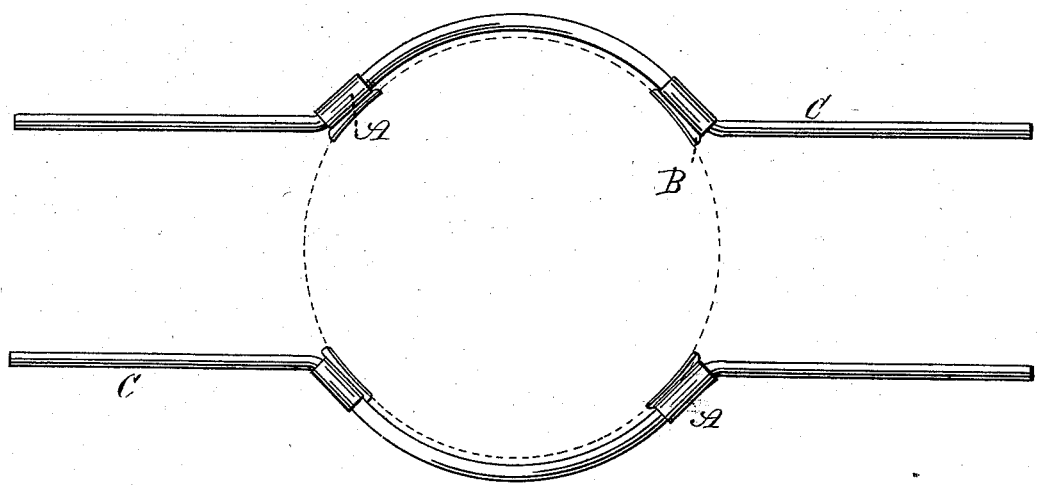
Witnesses:
J. W. Garner.
W. S. D. Hames.
Inventor
George Dee,
by Howard A. Snow.
Attorney.

UNITED STATES PATENT OFFICE.

GEORGE DEE, OF DIXON, ILLINOIS.

STOVE-LIFTER.

SPECIFICATION forming part of Letters Patent No. 254,933, dated March 14, 1882.

Application filed January 16, 1882. (No model.)

*To all whom it may concern:*

Be it known that I, GEORGE DEE, a citizen of the United States, residing at Dixon, in the county of Lee and State of Illinois, have invented certain new and useful Improvements in Stove-Lifters, of which the following is a specification, reference being had therein to the accompanying drawings.

My invention relates to a device for lifting, moving, and carrying stoves; and it consists in the construction and arrangement of its parts, as will be hereinafter fully set forth, and pointed out in the claims.

Figure 1 is a combined sleeve and clutch, A being the sleeve and B the clutch. It is constructed of one piece of metal, formed as shown in the drawings, and riveted together at *a*. The free end of the clutch is provided with teeth and slightly convexed on its edge, and inclines slightly inward at its center in order to more securely retain its hold upon the stove. The sleeve A is notched at *a'* to allow curved bars C to be used when necessary.

Fig. 2 is a view of the lifter as applied, the stove being shown in dotted lines.

In the drawings I have shown the bars curved to conform to the convexity of the stove, but provide that the clutches may be placed upon straight bars, if desired.

What I claim is—

1. A stove-carrier consisting of the clutch B and sleeve A, the clutch being provided with teeth on its upper edge, substantially as shown and described.

2. The combination of the sleeve and clutch B with a lifting or carrying bar adapted to be run through the sleeve, substantially as and for the purposes set forth.

In testimony whereof I affix my signature in presence of two witnesses.

GEORGE DEE.

Witnesses:
S. H. BETHEA,
W. W. BETHEA.